US012601356B1

(12) United States Patent
Yang et al.

(10) Patent No.: US 12,601,356 B1
(45) Date of Patent: Apr. 14, 2026

(54) OMNIDIRECTIONALLY ADJUSTABLE HANDHELD FAN

(71) Applicant: Shenzhen Qingchun Power Technology Co., Ltd., Shenzhen (CN)

(72) Inventors: Xing Yang, Shenzhen (CN); Zhengxi Qiu, Shenzhen (CN)

(73) Assignee: Shenzhen Qingchun Power Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/264,393

(22) Filed: Jul. 9, 2025

(30) Foreign Application Priority Data

May 13, 2025 (CN) .......................... 202510614965.8

(51) Int. Cl.
| | |
|---|---|
| *F04D 25/08* | (2006.01) |
| *A01G 20/47* | (2018.01) |
| *A45D 20/00* | (2006.01) |
| *A45D 20/10* | (2006.01) |
| *A45D 20/12* | (2006.01) |
| *F04B 17/06* | (2006.01) |
| *F04D 19/00* | (2006.01) |
| *F04D 25/06* | (2006.01) |
| *F04D 27/00* | (2006.01) |
| *F04D 29/52* | (2006.01) |

(52) U.S. Cl.
CPC ........... *F04D 25/084* (2013.01); *A01G 20/47* (2018.02); *A45D 20/00* (2013.01); *A45D 20/10* (2013.01); *A45D 20/12* (2013.01); *F04B 17/06* (2013.01); *F04D 19/002* (2013.01); *F04D 25/0673* (2013.01); *F04D 25/08* (2013.01); *F04D 29/522* (2013.01); *F04D 27/004* (2013.01)

(58) Field of Classification Search
CPC .. F04D 25/084; F04D 25/0673; F04D 19/002; F04D 29/522; F04D 25/08; A45D 20/12; A45D 20/10; A45D 20/00; A45D 20/50; A01G 20/47; F04B 17/06
See application file for complete search history.

(56) References Cited

U.S. PATENT DOCUMENTS

| | | | | |
|---|---|---|---|---|
| 1,254,042 A * | 1/1918 | Howe | ...................... | A47B 3/12 |
| | | | | 248/431 |
| 2,595,406 A * | 5/1952 | Popovich | .................. | F21L 2/00 |
| | | | | 417/313 |
| 3,647,323 A * | 3/1972 | Thomas | ................... | H02K 7/14 |
| | | | | 415/206 |
| 4,734,017 A * | 3/1988 | Levin | ..................... | H02K 7/145 |
| | | | | D32/15 |
| 7,285,117 B2 * | 10/2007 | Krueger | ................. | A61B 18/00 |
| | | | | 606/41 |
| 11,583,053 B2 * | 2/2023 | Kennedy | .............. | A45D 20/122 |
| 2003/0054883 A1 * | 3/2003 | Sakiyama | ............. | A63F 13/245 |
| | | | | 463/36 |
| 2023/0265854 A1 * | 8/2023 | Chen | ..................... | F04D 19/002 |
| | | | | 416/63 |

* cited by examiner

*Primary Examiner* — Peter J Bertheaud

(57) ABSTRACT

An omnidirectionally adjustable handheld fan includes a fan main body having an air outlet assembly, a handle connected to the fan main body, a detection device, and a control mainboard. The handle includes a trackball. The detection device is electrically connected to the control mainboard, the detection device is configured to detect a rotation direction of the trackball, and the control mainboard is configured to adjust a airflow rate of the air outlet assembly based on the rotation direction of the trackball.

17 Claims, 6 Drawing Sheets

OMNIDIRECTIONALLY ADJUSTABLE HANDHELD FAN

CROSS-REFERENCE TO RELATED APPLICATIONS

The application claims priority of Chinese patent application CN2025106149658, filed on May 13, 2025, which is incorporated herein by reference in its entireties.

TECHNICAL FIELD

The present invention relates to the technical field of fans, and in particular, to an omnidirectionally adjustable handheld fan.

BACKGROUND

In high-temperature environments during summer, handheld fans are widely adopted due to their lightweight and flexible characteristics. Currently, conventional handheld fans typically adjust airflow rate using buttons or knobs. This traditional operation method not only has limited functionality but also lacks both operational intuitiveness and adjustment convenience, resulting in suboptimal user experience.

Therefore, there exists a need for an omnidirectionally adjustable handheld fan that enables faster and more precise adjustment of the fan's airflow rate, thereby improving operational convenience and user experience.

SUMMARY

In order to overcome the shortcomings of the prior art, the present invention provides an omnidirectionally adjustable handheld fan that enables faster and more precise adjustment of the fan's airflow rate, thereby improving operational convenience and user experience.

The technical solution adopted by the present invention to solve the technical problem is as follows.

An omnidirectionally adjustable handheld fan, which includes a fan main body and a handle.

The fan main body includes an air outlet assembly.

The handle is connected to the fan main body, the handle includes a trackball, a detection device, and a control mainboard.

The detection device is electrically connected to the control mainboard, the detection device is configured to detect a rotation direction of the trackball, and the control mainboard is configured to adjust a airflow rate of the air outlet assembly based on the rotation direction of the trackball.

As an improvement of the present invention, the air outlet assembly includes a motor, a rotating shaft connected to the motor, and a fan blade connected to the rotating shaft; the control mainboard is configured to adjust a rotational speed of the motor and the fan blade based on the rotation direction of the trackball.

As an improvement of the present invention, the detection device includes an image sensor configured to emit light toward the trackball, and receive light reflected from the trackball in response to rotation of the trackball.

As an improvement of the present invention, the control mainboard is configured to determine the rotation direction of the trackball based on reflected light received by the image sensor, and adjust an input voltage of the motor based on the rotation direction.

As an improvement of the present invention, the detection device further includes a light guide component disposed between the image sensor and the trackball; the light guide component is configured to guide and concentrate the light emitted from the image sensor to form a light pattern onto the trackball, and guide and concentrate the reflected light from the trackball to the image sensor.

As an improvement of the present invention, when the trackball is rotated upward, the control mainboard increases the input voltage of the motor, thereby increasing the rotational speed of the motor and the fan blade.

As an improvement of the present invention, when the trackball is rotated downward, the control mainboard decreases the input voltage of the motor, thereby decreasing the rotational speed of the motor and the fan blade.

As an improvement of the present invention, when the trackball is rotated rightward, the control mainboard increases the input voltage of the motor, thereby increasing the rotational speed of the motor and the fan blade.

As an improvement of the present invention, when the trackball is rotated leftward, the control mainboard decreases the input voltage of the motor, thereby decreasing the rotational speed of the motor and the fan blade.

As an improvement of the present invention, the light guide component includes a condensing lens; the image sensor is configured to emit light through the condensing lens onto the trackball, and receive light reflected from the trackball in response to rotation of the trackball.

As an improvement of the present invention, the control mainboard includes a DSP processor; the DSP processor is configured to determine the rotation direction of the trackball in response to the reflected light received by the image sensor; and the DSP processor is configured to adjust the input voltage of the motor based on the rotation direction.

As an improvement of the present invention, the handle includes a handle shell; the handle shell peripherally encloses an installation space; the handle shell includes a first mounting housing recessed from an outer wall of the handle shell toward the installation space; the first mounting housing includes a spherical fixing cavity; and the trackball is rotatably mounted in the spherical fixing cavity.

As an improvement of the present invention, the handle shell further includes a second mounting housing disposed within the installation space and connected to the first mounting housing; the second mounting housing includes a mounting cavity; and the spherical fixing cavity is provided with a light-guiding hole in communication with the mounting cavity.

As an improvement of the present invention, the light guide component is mounted within the mounting cavity; and the control mainboard is mounted in the installation space.

As an improvement of the present invention, the spherical fixing cavity has a partially spherical shape matching the trackball; the spherical fixing cavity is provided with a limiting groove; a rolling ball is disposed within the limiting groove.

As an improvement of the present invention, the spherical fixing cavity is provided with three limiting grooves; the three limiting grooves are arranged in an annular array within the spherical fixing cavity; and each of the three limiting grooves is provided with the rolling ball.

As an improvement of the present invention, the first mounting housing includes a peripheral flange protruding from the outer wall of the handle shell; the peripheral flange circumferentially forms a mounting ring groove; the handle is further provided with a spherical fixing ring configured to fix the trackball; and the spherical fixing ring is disposed within the mounting ring groove.

As an improvement of the present invention, the spherical fixing ring is provided with a snap latch protruding from a bottom circumferential edge thereof; and the first mounting housing is provided with a snap groove configured to engage with the snap latch.

As an improvement of the present invention, the handle is further provided with a switch button; and the switch button is electrically connected to the control mainboard.

As an improvement of the present invention, the handle is further provided with a power charging port; and the power charging port is electrically connected to the control mainboard.

The present invention has the beneficial effects. The present invention provides an omnidirectionally adjustable handheld fan includes a fan main body, and a handle connected to the fan main body; the fan main body includes an air outlet assembly; the handle includes a trackball, a detection device, and a control mainboard; wherein the detection device is electrically connected to the control mainboard, the detection device is configured to detect a rotation direction of the trackball, and the control mainboard is configured to adjust a airflow rate of the air outlet assembly based on the rotation direction of the trackball. The integration of the trackball, the detection device, and the control mainboard on the handle enables precise airflow rate control of the air outlet assembly. Through simple rolling of the trackball by a user, the detection device can detect the rotation direction of the trackball, with the control mainboard adjusting the airflow rate accordingly. Compared to conventional button-type or touch-based adjustment methods, this design is more intuitive and flexible, improving operational convenience and interactivity. Additionally, the rotational operation of the trackball provides optimized tactile feedback, which can greatly enhance the user experience.

BRIEF DESCRIPTION OF THE DRAWINGS

In order to explain the technical solutions of the embodiments of the present invention more clearly, the following will briefly introduce the accompanying drawings used in the embodiments. Apparently, the drawings in the following description are only some embodiments of the present invention. Those of ordinary skill in the art can obtain other drawings based on these drawings without creative work.

The present invention is further described below in detail in combination with the accompanying drawings and embodiments.

DETAILED DESCRIPTION OF THE EMBODIMENTS

Figure 1:
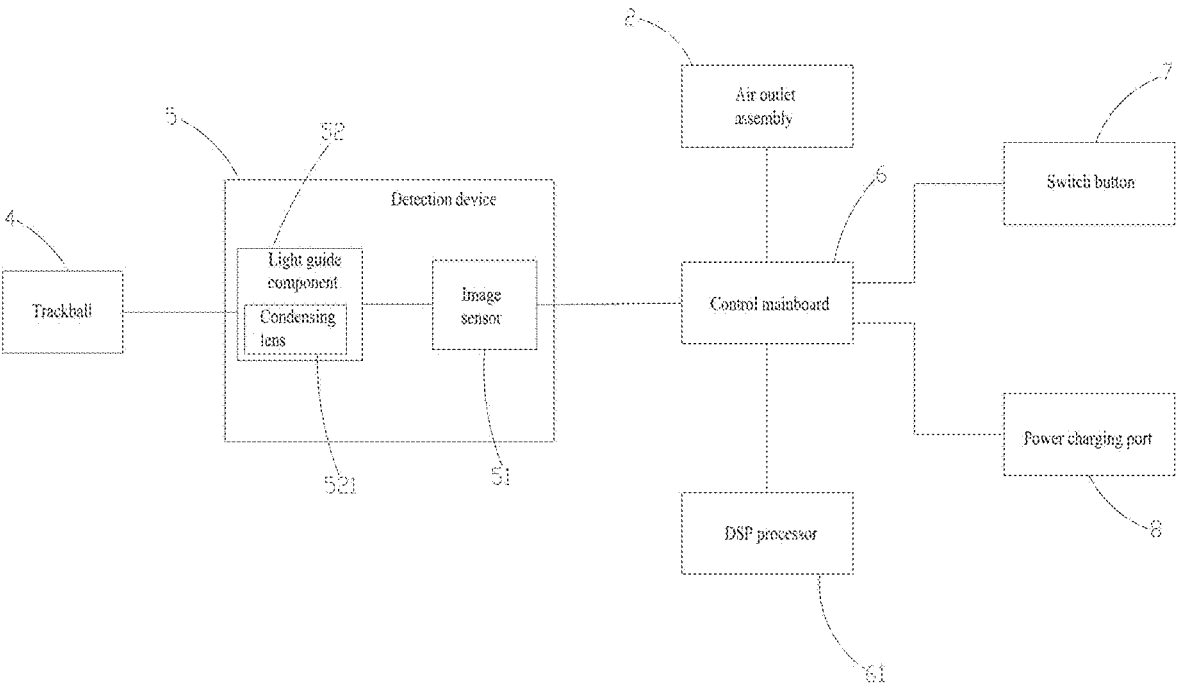
FIG. 1 is a logic block diagram according to the present invention.
Figure 2:
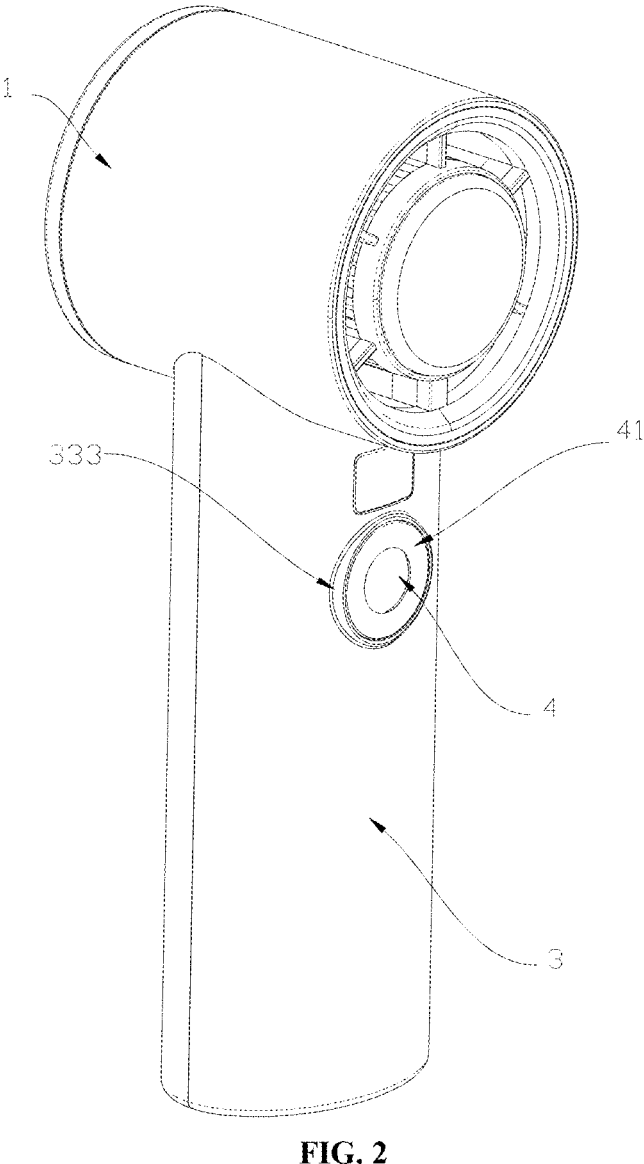
FIG. 2 is a schematic diagram of an overall structure according to the present invention.
Figure 3:
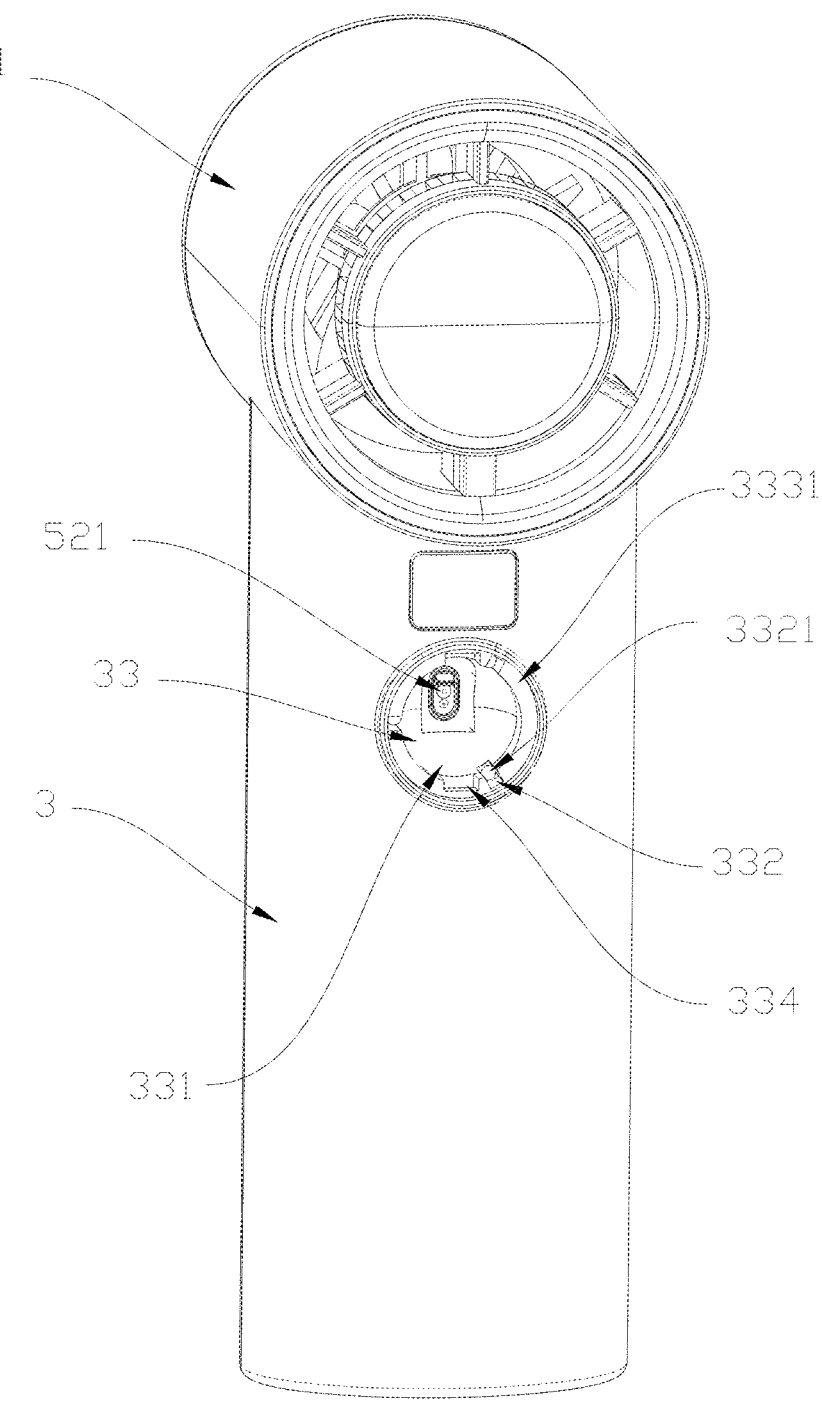
FIG. 3 is a structural schematic diagram with the trackball and the spherical fixing ring removed.
Figure 4:
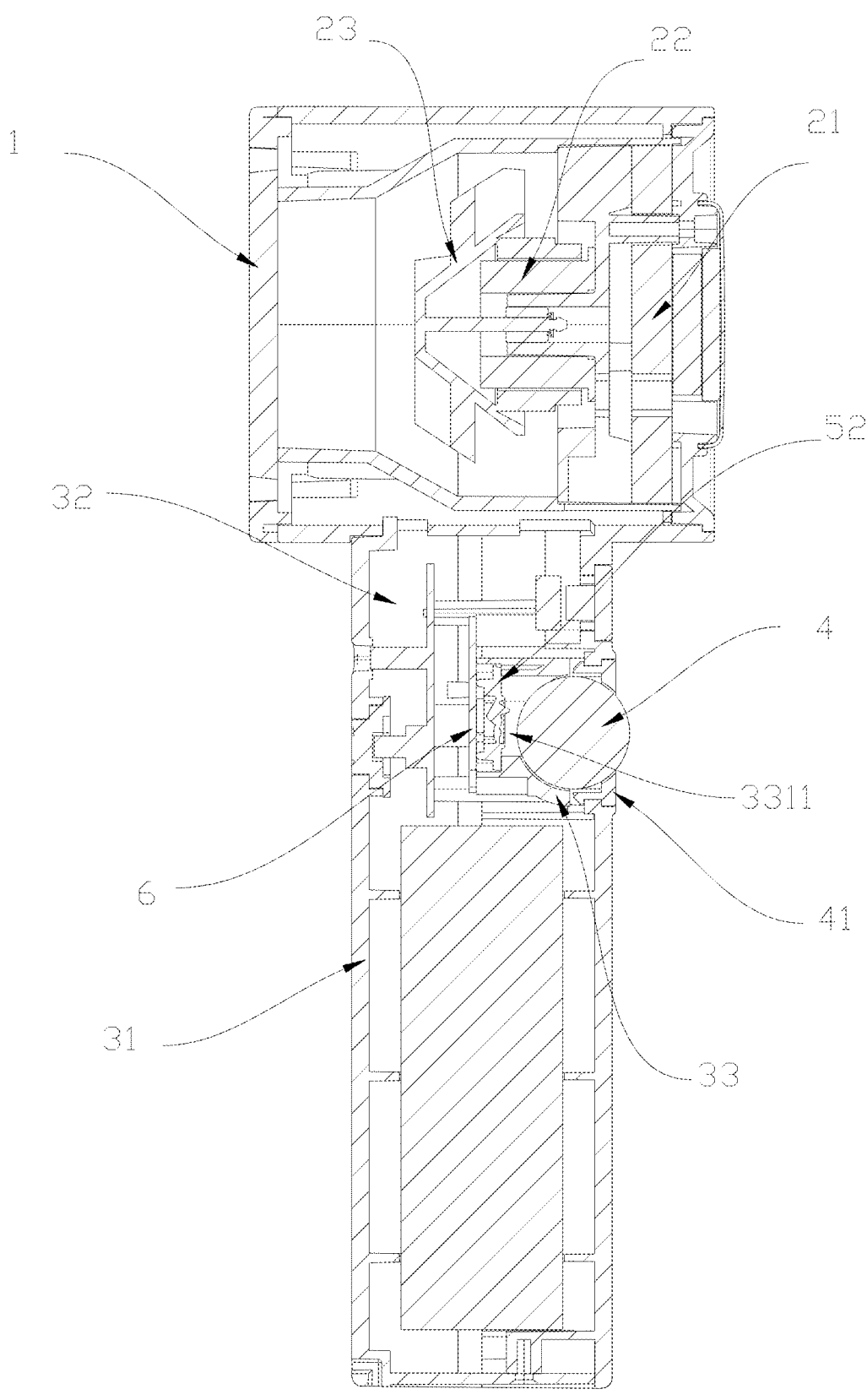
FIG. 4 is a cross-sectional view taken along the trackball according to the present invention.
Figure 5:
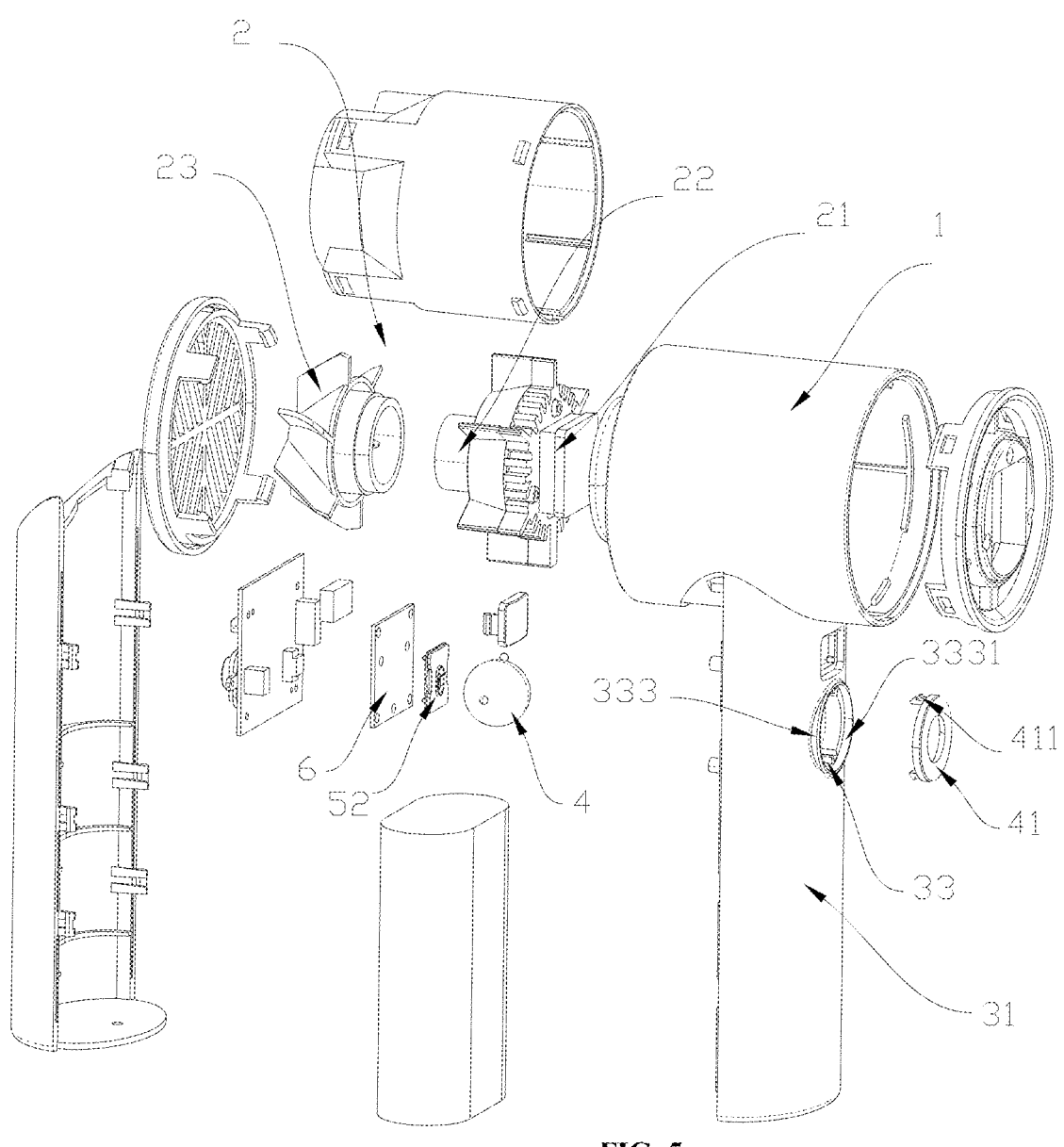
FIG. 5 is an exploded view according to the present invention.
Figure 6:
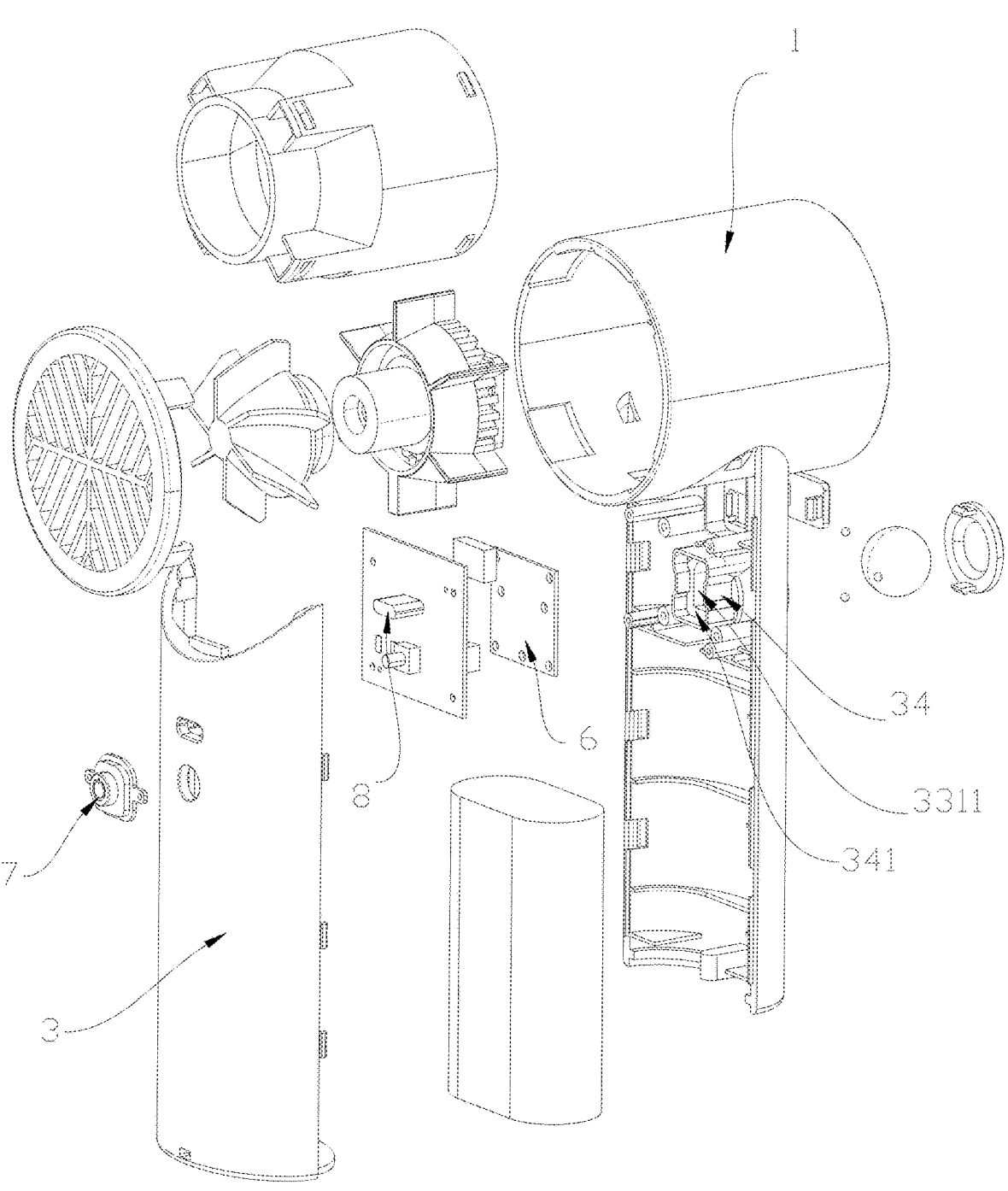
FIG. 6 is an exploded view according to the present invention from another perspective.

Referring to FIG. 1 to FIG. 6, an omnidirectionally adjustable handheld fan includes a fan main body 1, and a handle 3 connected to the fan main body 1; the fan main body 1 includes an air outlet assembly 2; the handle 3 includes a trackball 4, a detection device 5, and a control mainboard 6; wherein the detection device 5 is electrically connected to the control mainboard 6, the detection device 5 is configured to detect a rotation direction of the trackball 4, and the control mainboard 6 is configured to adjust a airflow rate of the air outlet assembly 2 based on the rotation direction of the trackball 4.

With the above structure, the integration of the trackball 4, the detection device 5, and the control mainboard 6 on the handle 3 enables precise airflow rate control of the air outlet assembly 2. Through simple rolling of the trackball 4 by a user, the detection device 5 can detect the rotation direction of the trackball 4, with the control mainboard 6 adjusting the airflow rate accordingly. Compared to conventional button-type or touch-based adjustment methods, this design is more intuitive and flexible, improving operational convenience and interactivity. Additionally, the rotational operation of the trackball 4 provides optimized tactile feedback, which can greatly enhance the user experience.

In this embodiment, the air outlet assembly 2 includes a motor 21, a rotating shaft 22 connected to the motor 21, and a fan blade 23 connected to the rotating shaft 22; the control mainboard 6 is configured to adjust the rotational speed of the motor 21 and the fan blade 23 based on the rotation direction of the trackball 4. The control mainboard 6 is electrically connected to the motor 21; through the control mainboard 6 adjusting the rotational speed of the motor 21 and the fan blade 23 based on the rotation direction of the trackball 4, stepless adjustment of the airflow rate is achieved. Compared with the conventional multi-gear airflow rate switching method, the present invention provides smoother and more continuous speed regulation, thereby improving adaptability in various usage scenarios and user comfort.

In this embodiment, the detection device 5 includes an image sensor 51, where the image sensor 51 is configured to emit light toward the trackball 4, and when the trackball 4 is rotated, the trackball 4 reflects the light to the image sensor 51; the control mainboard 6 is configured to determine the rotation direction of the trackball 4 based on the reflected light received by the image sensor 51, and adjust the input voltage of the motor 21 based on the rotation direction. By using the image sensor 51, optical recognition of the rotation direction of the trackball 4 is achieved. The image sensor 51 emits light toward the trackball 4, receives the reflected light within a unit time, and then the control mainboard 6 can accurately sense the rotation direction of the trackball 4 through calculation by its analysis circuit. This avoids problems such as contact wear and response lag that may occur in conventional mechanical detection devices, improving the durability and response sensitivity of the equipment. Meanwhile, the control mainboard 6 dynamically adjusts the input voltage of the motor 21 based on the detected rotation direction of the trackball 4, realizing stepless speed control of the airflow rate of the fan, making the airflow rate adjustment smoother and more delicate, and meeting the diverse comfort needs of users in different environments.

In this embodiment, the detection device 5 includes an image sensor 51 configured to emit light toward the trackball 4 and receive light reflected from the trackball 4 in response to rotation of the trackball 4; the control mainboard 6 is configured to determine the rotation direction of the trackball 4 based on the reflected light received by the image sensor 51, and adjust the input voltage of the motor 21 based on the rotation direction. By utilizing the image sensor 51, optical recognition of the trackball's rotation direction is achieved. The image sensor 51 emits light to illuminate the trackball 4 and receives the reflected light, enabling the control mainboard 6 to accurately calculate the rotation direction through its analysis circuitry. This design eliminates drawbacks such as contact wear and response lag associated with conventional mechanical detection devices, thereby enhancing equipment durability and response sensitivity. Concurrently, the control mainboard 6 adjusts the input voltage of the motor 21 based on the detected rotation direction, realizing stepless speed control of the fan's airflow rate. This results in smoother and more precise airflow adjustments that effectively meet diverse user comfort requirements across various environments.

In this embodiment, the detection device 5 further includes a light guide component 52 disposed between the image sensor 51 and the trackball 4. The light guide component 52 is configured to guide and concentrate the light emitted from the image sensor 51 to form a light pattern onto the trackball 4, and guide and concentrate the reflected light from the trackball 4 to the image sensor 51. By arranging the light guide component 52 between the image sensor 51 and the trackball 4, the light emitted by the image sensor 51 can be more concentrated and accurately directed onto the surface of the trackball 4. Meanwhile, the light guide component 52 can effectively guide and concentrate the reflected light from the trackball 4 to the image sensor 51, thereby improving the imaging quality and light collection efficiency of optical detection.

In this embodiment, when the trackball 4 is rotated upward, the control mainboard 6 increases the input voltage of the motor 21, thereby increasing the rotational speed of the motor 21 and the fan blade 23. When the trackball 4 is rotated downward, the control mainboard 6 decreases the input voltage of the motor 21, thereby decreasing the rotational speed of the motor 21 and the fan blade 23. When the trackball 4 is rotated rightward, the control mainboard 6 increases the input voltage of the motor 21, thereby increasing the rotational speed of the motor 21 and the fan blade 23. When the trackball 4 is rotated leftward, the control mainboard 6 decreases the input voltage of the motor 21, thereby decreasing the rotational speed of the motor 21 and the fan blade 23. By configuring different voltage adjustment logics for the motor 21 corresponding to different rotation directions of the trackball 4, users can flexibly control the airflow rate through simple and intuitive gesture operations. Specifically, when the user rolls the trackball 4 upward or rightward, the control mainboard 6 increases the input voltage to the motor 21, thereby increasing the rotational speed of the fan blade 23 and enhancing the airflow intensity. When the user rolls the trackball 4 downward or leftward, the control mainboard 6 decreases the input voltage to the motor 21, thereby reducing the airflow rate. This design improves the human-machine interaction experience while eliminating cumbersome button operations. The configuration is particularly suitable for single-handed operation scenarios, significantly enhancing the practicality and convenience of the handheld fan.

In this embodiment, the light guide component 52 includes a condensing lens 521. The control mainboard 6 includes a DSP processor 61. The image sensor 51 is configured to emit light through the condensing lens 521 onto the trackball, and receive light reflected from the trackball 4 in response to rotation of the trackball 4. The DSP processor 61 is configured to determine the rotation direction of the trackball 4 in response to the reflected light received by the image sensor 51; and the DSP processor 61 is configured to adjust the input voltage of the motor 21 based on the rotation direction. The condensing lens 521 effectively concentrates and directs the light emitted by the image sensor 51, enabling more focused illumination on the surface of the trackball 4. This enhances both the light intensity and irradiation precision, thereby improving the quality of the reflected light signal from the trackball 4. When the image sensor 51 receives clearer and more stable reflected light, the DSP processor 61 can accurately analyze the reflected light intensity with higher processing efficiency and rapidly determine the rotation direction of the trackball 4. Compared with conventional microcontrollers, the DSP processor 61 demonstrates superior data processing capability and response speed.

In this embodiment, the handle 3 includes a handle shell 31; the handle shell 31 peripherally encloses an installation space 32; the handle shell 31 includes a first mounting housing 33 recessed from an outer wall of the handle shell 31 toward the installation space 32; the first mounting housing 33 includes a spherical fixing cavity 331; the handle shell 31 further includes a second mounting housing 34 disposed within the installation space 32 and connected to the first mounting housing 33; the second mounting housing 34 includes a mounting cavity 341; the spherical fixing cavity 331 is provided with a light-guiding hole 3311 in communication with the mounting cavity 341; the trackball 4 is rotatably mounted in the spherical fixing cavity 331; the light guide component 52 is mounted within the mounting cavity 341; and the control mainboard 6 is mounted in the installation space 32. The provision of the first mounting housing 33 and the second mounting housing 34 enables partitioned arrangement and stable installation of the trackball 4, the light guide component 52, and the control mainboard 6. The spherical fixing cavity 331 ensures flexible rotation of the trackball 4, and meanwhile, through the light-guiding hole 3311 in communication with the mounting cavity 341, the light emitted by the image sensor 51 and the light reflected from the trackball 4 can be transmitted smoothly.

In this embodiment, the spherical fixing cavity 331 has a partially spherical shape matching the trackball 4; the spherical fixing cavity 331 is provided with a limiting groove 332; a rolling ball 3321 is disposed within the limiting groove 332. The spherical fixing cavity 331 is provided with three limiting grooves 332; the three limiting grooves 332 are arranged in an annular array within the spherical fixing cavity 331; and each of the three limiting grooves 332 is provided with the rolling ball 3321. By designing the spherical fixing cavity 331 as a partial spherical cavity that matches the trackball 4 and arranging three limiting grooves 332 in an annular array, each with a rolling ball 3321, stable support and flexible rotation of the trackball 4 are achieved.

In this embodiment, the first mounting housing 33 includes a peripheral flange 333 protruding from the outer wall of the handle shell 31; the peripheral flange 333 circumferentially forms a mounting ring groove 3331; the handle 3 is further provided with a spherical fixing ring 41 configured to fix the trackball 4; the spherical fixing ring 41 is disposed within the mounting ring groove 3331; the spherical fixing ring 41 is provided with a snap latch 441 protruding from a bottom circumferential edge thereof; and the first mounting housing 33 is provided with a snap groove 334 configured to engage with the snap latch 441. By mounting the spherical fixing ring 41 within the mounting ring groove 3331 and engaging the snap latch 411 on the bottom circumferential edge of the spherical fixing ring 41 with the snap groove 334 on the first mounting housing 33, the installation structure of the trackball 4 achieves good assembly reliability and ease of disassembly. This configuration also contributes to enhancing the structural integrity and durability of the entire handheld fan device, making it suitable for various daily use environments.

In this embodiment, the handle 3 is further provided with a switch button 7 and a power charging port 8; and both the switch button 7 and the power charging port 8 are electrically connected to the control mainboard 6. By arranging the switch button 7 and the power charging port 8 on the handle 3 electrically connected to the control mainboard 6, the design provides both convenient user operation and charging functionality.

As described above, one or more embodiments are provided in conjunction with the detailed description, The specific implementation of the present invention is not confirmed to be limited to that the description is similar to or similar to the method, the structure and the like of the present invention, or a plurality of technical deductions or substitutions are made on the premise of the conception of the present invention to be regarded as the protection of the present invention.

What is claimed is:

1. An omnidirectionally adjustable handheld fan, comprising:

a fan main body comprising an air outlet assembly;

a handle connected to the fan main body, the handle comprising a trackball, a detection device, and a control mainboard;

wherein the detection device is electrically connected to the control mainboard, the detection device is configured to detect a rotation direction of the trackball, and the control mainboard is configured to adjust an airflow rate of the air outlet assembly based on the rotation direction of the trackball;

wherein the air outlet assembly comprises a motor, a rotating shaft connected to the motor, and a fan blade connected to the rotating shaft; the control mainboard is configured to adjust a rotational speed of the motor and the fan blade based on the rotation direction of the trackball;

wherein the detection device comprises an image sensor configured to emit light toward the trackball, and receive light reflected from the trackball in response to rotation of the trackball;

wherein the detection device further comprises a light guide component disposed between the image sensor and the trackball; the light guide component is configured to guide and concentrate the light emitted from the image sensor to form a light pattern onto the trackball, and guide and concentrate the reflected light from the trackball to the image sensor.

2. The omnidirectionally adjustable handheld fan according to claim 1, wherein the control mainboard is configured to determine the rotation direction of the trackball based on reflected light received by the image sensor, and adjust an input voltage of the motor based on the rotation direction.

3. The omnidirectionally adjustable handheld fan according to claim 1, wherein when the trackball is rotated upward, the control mainboard increases the input voltage of the motor, thereby increasing the rotational speed of the motor and the fan blade.

4. The omnidirectionally adjustable handheld fan according to claim 3, wherein when the trackball is rotated downward, the control mainboard decreases the input voltage of the motor, thereby decreasing the rotational speed of the motor and the fan blade.

5. The omnidirectionally adjustable handheld fan according to claim 4, wherein when the trackball is rotated rightward, the control mainboard increases the input voltage of the motor, thereby increasing the rotational speed of the motor and the fan blade.

6. The omnidirectionally adjustable handheld fan according to claim 5, wherein when the trackball is rotated leftward, the control mainboard decreases the input voltage of the motor, thereby decreasing the rotational speed of the motor and the fan blade.

7. The omnidirectionally adjustable handheld fan according to claim 1, wherein the light guide component comprises a condensing lens; the image sensor is configured to emit light through the condensing lens onto the trackball, and receive light reflected from the trackball in response to rotation of the trackball.

8. The omnidirectionally adjustable handheld fan according to claim 1, wherein the control mainboard comprises a DSP processor; the DSP processor is configured to determine the rotation direction of the trackball in response to the reflected light received by the image sensor; and the DSP processor is configured to adjust the input voltage of the motor based on the rotation direction.

9. The omnidirectionally adjustable handheld fan according to claim 1, wherein the handle comprises a handle shell; the handle shell peripherally encloses an installation space; the handle shell comprises a first mounting housing recessed from an outer wall of the handle shell toward the installation space; the first mounting housing comprises a spherical fixing cavity; and the trackball is rotatably mounted in the spherical fixing cavity.

10. The omnidirectionally adjustable handheld fan according to claim 9, wherein the handle shell further comprises a second mounting housing disposed within the installation space and connected to the first mounting housing; the second mounting housing comprises a mounting cavity; and the spherical fixing cavity is provided with a light-guiding hole in communication with the mounting cavity.

11. The omnidirectionally adjustable handheld fan according to claim 10, wherein the light guide component is mounted within the mounting cavity; and the control mainboard is mounted in the installation space.

12. The omnidirectionally adjustable handheld fan according to claim 9, wherein the spherical fixing cavity has a partially spherical shape matching the trackball; the spherical fixing cavity is provided with a limiting groove; a rolling ball is disposed within the limiting groove.

13. The omnidirectionally adjustable handheld fan according to claim 12, wherein the spherical fixing cavity is provided with three limiting grooves; the three limiting grooves are arranged in an annular array within the spherical fixing cavity; and each of the three limiting grooves is provided with the rolling ball.

14. The omnidirectionally adjustable handheld fan according to claim 9, wherein the first mounting housing comprises a peripheral flange protruding from the outer wall of the handle shell; the peripheral flange circumferentially forms a mounting ring groove; the handle is further provided with a spherical fixing ring configured to fix the trackball; and the spherical fixing ring is disposed within the mounting ring groove.

15. The omnidirectionally adjustable handheld fan according to claim 14, wherein the spherical fixing ring is provided with a snap latch protruding from a bottom circumferential edge thereof; and the first mounting housing is provided with a snap groove configured to engage with the snap latch.

16. The omnidirectionally adjustable handheld fan according to claim 1, wherein the handle is further provided with a switch button; and the switch button is electrically connected to the control mainboard.

17. The omnidirectionally adjustable handheld fan according to claim 1, wherein the handle is further provided with a power charging port; and the power charging port is electrically connected to the control mainboard.

*    *    *    *    *